United States Patent [19]

Gortsema et al.

[11] Patent Number: 4,569,833
[45] Date of Patent: Feb. 11, 1986

[54] MODIFICATION OF ALUMINOPHOSPHATE MOLECULAR SIEVES BY TREATMENT WITH A SILICON TETRAFLUORIDE GAS MIXTURE

[75] Inventors: Frank P. Gortsema, Pleasantville; Brent M. Lok, New City, both of N.Y.

[73] Assignee: Union Carbide Corporation, Danbury, Conn.

[21] Appl. No.: 725,503

[22] Filed: Apr. 24, 1985

Related U.S. Application Data

[62] Division of Ser. No. 403,928, Aug. 2, 1982, abandoned.

[51] Int. Cl.$^4$ .............................................. C01B 25/36
[52] U.S. Cl. ................................... 423/305; 423/328; 423/329; 502/85; 502/208; 502/214
[58] Field of Search ................. 423/305; 502/208, 214

[56] References Cited

U.S. PATENT DOCUMENTS

| | | | |
|---|---|---|---|
| 3,384,652 | 5/1968 | Hamilton | 252/455 Z |
| 3,413,370 | 11/1968 | Fishel | 260/666 |
| 3,477,965 | 11/1969 | Fishel | 252/442 |
| 3,594,331 | 7/1971 | Elliott, Jr. | 252/442 |
| 3,630,965 | 12/1971 | Voorhies, Jr. et al. | 252/442 |
| 3,644,220 | 2/1972 | Kearby | 252/455 Z |
| 3,699,056 | 10/1972 | Takase et al. | 252/442 |
| 3,702,312 | 11/1972 | Wilson | 252/442 |
| 3,839,539 | 10/1974 | Elliott, Jr. | 423/329 |
| 3,933,983 | 1/1976 | Elliott, Jr. | 423/328 |
| 3,980,586 | 9/1976 | Mitchell | 252/455 Z |
| 4,060,568 | 11/1977 | Rodewald | 260/682 |
| 4,273,753 | 6/1981 | Chang | 423/328 |
| 4,297,335 | 10/1981 | Lok et al. | 423/328 |
| 4,310,440 | 1/1982 | Wilson et al. | 252/430 |
| 4,473,663 | 9/1984 | Patton et al. | 502/208 |

FOREIGN PATENT DOCUMENTS

2303764 3/1976 France .

OTHER PUBLICATIONS

H. K. Beyer and I. Belenykaja, A New Method for the Dealumination of Faujasite-Type Zeolites, Catalysis by Zeolites, Printed in the Netherlands, 203-209 (1980).
Cotton & Wilkinson, Advanced Inorganic Chemistry, 2nd Ed., Interscience Publ., p. 467 (1966).
E. A. V. Ebsworth, International Series of Monographs on Inorganic Chemistry, *Volatile Silicon Compounds,* Pergammon Press, MacMillan Co., N.Y. (1963) pp. 58, 62, 66.

*Primary Examiner*—John Doll
*Assistant Examiner*—Jackson Leeds
*Attorney, Agent, or Firm*—Gary L. Wamer

[57] ABSTRACT

Described herein is a process for enhancing the hydrophobicity of crystalline molecular sieves and also crystalline molecular sieve compositions which have enhanced hydrophobic character and modified catalytic properties. The crystalline molecular sieves are contacted with a silicon tetrafluoride gas mixture at a temperature from about ambient to about 200° C. to alter (1) the framework aluminum and silica content, (2) the surface characteristics, and (3) the acidic sites of the molecular sieves with resulting modification of both the adsorptive properties, i.e., enhanced hydrophobicity, and catalytic properties of the molecular sieves. The crystalline molecular sieves can further undergo ion exchange to remove any aluminum fluoride cation species such as $AlF^{++}$ and $AlF_2^+$. The crystalline molecular sieve compositions of this invention are useful as selective hydrophobic adsorbents and catalysts.

7 Claims, No Drawings

MODIFICATION OF ALUMINOPHOSPHATE MOLECULAR SIEVES BY TREATMENT WITH A SILICON TETRAFLUORIDE GAS MIXTURE

This application is a division of prior U.S. application Ser. No. 403,928 filing date 8/2/82 abandoned.

BRIEF SUMMARY OF THE INVENTION

1. Technical Field

This invention is directed in general to a process for enhancing the hydrophobicity of crystalline molecular sieves and to crystalline molecular sieve compositions which have enhanced hydrophobic character and modified catalytic properties. More particularly, this invention is directed to crystalline molecular sieves which have been treated with a silicon tetrafluoride gas mixture to alter (1) the framework aluminum and silica content, (2) surface characteristics, and (3) the acidic sites of the molecular sieves with resulting modification of both the adsorptive properties, i.e. enhanced hydrophobicity, and catalytic properties of the molecular sieves.

2. Background Art

Although there are a few notable exceptions, the vast majority of naturally-occurring and synthetic crystalline aluminosilicate zeolite molecular sieves contain a substantial proportion of $AlO_4$-tetrahedra, i.e., framework aluminum atoms, which together with the $SiO_4$-tetrahedra comprise the zeolite molecular sieve crystal framework. It is generally accepted that these aluminum-containing structural units provide the so-called "acid-sites" which account for the catalytic activity of molecular sieves in such hydrocarbon conversion reactions as catalytic cracking. These same acid sites are also responsible in one or more ways for the adsorptive preference of most zeolite molecular sieves for strongly polar molecules such as water, i.e. their hydrophilic character. For a very complete description of zeolite molecular sieves, see "Zeolite Molecular Sieves" by D. W. Breck, John Wiley and Sons, New York, N.Y. (1974).

A number of different techniques have heretofore been proposed to remove framework aluminum atoms from zeolite molecular sieves to create aluminum-deficient lattice structures having fewer acid sites, and consequently less hydrophilicity and more hydrophobicity, and an altered catalytic activity. In some instances the techniques employed are too rigorous to permit sufficient dealumination to significantly alter either the hydrophilicity or the catalytic activity before causing the collapse of the entire crystal lattice. In other cases, the lattice structure of the starting zeolite molecular sieve has sufficient integrity so that the dealumination is permitted to proceed to a degree which engenders a remarkable degree of hydrophobicity in the product zeolite molecular sieve and further enhances its thermal and/or hydrothermal stability.

A number of different techniques have heretofore been known to remove framework aluminum atoms from zeolite molecular sieves, such as mineral acid treatment. One of the more common early techniques for dealuminizing zeolite molecular sieves involves contacting either the hydrogen or the decationized form of the zeolite molecular sieve with a known chelating agent for aluminum, such as ethylene diaminetetraacetic acid (EDTA) or acetylacetone, and removing aluminum as an organometallic complex. A more recent and more widely used procedure involves prolonged contact of non-metallic cation forms of zeolite molecular sieves with steam at elevated temperatures which can exceed 800° C. Although quite effective for the intended purpose, the steaming procedures are very costly and highly energy-consuming.

Other known techniques effective for the intended purpose of removing framework aluminum atoms from zeolite molecular sieves require special precautions in regard to the handling of potentially hazardous materials in specified concentrations and/or the selecting of corrosion-resistant equipment suitable for utilization in the particular dealumination process and processes employing the dealuminated zeolite molecular sieves such as catalytic cracking reactions. High reaction temperatures are also required to carry out particular high energy-consuming dealumination processes in addition to the steaming process described above.

U.S. Pat. No. 4,297,335 assigned to Union Carbide Corporation describes crystalline aluminosilicate zeolite molecular sieve compositions which have been treated with a fluorine gas mixture to alter the framework aluminum content and acidic sites and thereby enhance the hydrophobic character of the zeolite molecular sieves. The fluorine gas mixture is comprised of (i) from 0.1 to 20 volume percent fluorine, (ii) from zero to 21 volume percent oxygen and (iii) as the remainder, one or a mixture of two or more inert gases, preferably nitrogen. The starting crystalline aluminosilicate zeolite molecular sieve compositions have at least 50 percent of the framework aluminum atoms not associated with metal cations and are contacted with the fluorine gas mixture at a temperature of from about 50° F. to 400° F.

Copending U.S. patent application Ser. No. 363,560, filed March 30, 1982, assigned to Union Carbide Corporation, describes a process for enhancing the hydrophobicity of crystalline aluminosilicate zeolite molecular sieves having an initial $SiO_2/Al_2O_3$ molar ratio of at least 5. The zeolite molecular sieves are treated with pure chlorine gas at a temperature of from about 200° C. to about 1000° C. and thereafter purged with a purge gas, i.e., nitrogen, to remove entrapped chlorine gas from the treated zeolite molecular sieve. This treatment results in modification of both the adsorptive properties, i.e., enhanced hydrophobicity, and the catalytic properties of the zeolite molecular sieves.

H. K. Beyer and I. Belenykaja, *A New Method for the Dealumination of Faujasite-Type Zeolites*, Catalysis by Zeolites, Printed in the Netherlands, 203-209 (1980) describes the dealumination of faujasite-type zeolite molecular sieves, particularly Y zeolite molecular sieves, using silicon tetrachloride as the dealuminizing agent. This dealumination process is carried out at high termperatures ranging from about 457° C. to about 557° C.

French Pat. No. 2,303,764 describes a process for increasing the molar ratio of $SiO_2/Al_2O_3$ in the crystalline skeleton of zeolite molecular sieves having $SiO_2/Al_2O_3$ molar ratios of less than 5. The zeolite molecular sieves are first dehydrated by heating to a temperature of at least 400° C. in a reactor equipped with at least one opening in the presence of air or inert gases. Thereafter, gases containing chlorine and/or hydrochloric acid are reacted with the dehydrated zeolite molecular sieve at temperatures between 400° C. and 700° C. It is stated that the zeolite molecular sieve product can then be treated by washing with aqueous solutions of ammonium salts or salts which give ammonium ions, strong aqueous mineral acids, caustic soda or alkaline solutions, or distilled water. Example 11 illustrates that the capacity of adsorption of zeolite molecular sieves with respect to water vapor is practically not altered by treatment of the zeolite molecular sieves according to the process described therein.

None of these references disclose a process for enhancing the hydrophobicity of crystalline aluminosilicate zeolite molecular sieves and crystalline aluminophosphate molecular sieves according to the present invention in which the crystalline molecular sieves are treated with a gas mixture containing (i) from 0.1 to 100 volume percent silicon tetrafluoride, (ii) from zero to 21 volume percent oxygen, and (iii) as the remainder, one or a mixture of two or more inert gases. The present process is carried out at a temperature of from about ambient to about 200° C. for a period of time sufficient to alter (i) the framework aluminum and silica content, (2) surface characteristics and (3) the acidic sites of the molecular sieves with resulting modification of both the adsorptive properties, i.e., enhanced hydrophobicity, and catalytic properties of the molecular sieve. It is believed that silica associated with the silicon tetrafluoride is actually inserted into the structural framework of the crystalline molecular sieves by employing the process of this invention. In addition, the treated crystalline molecular sieves of the present invention are preferably ion exchanged with an aqueous solution, i.e., ammonium salt solution, for a sufficient time to remove aluminum fluoride cation species, i.e., $AlF^{++}$ and $AlF_2^+$, from the treated molecular sieves. The removal of aluminum flouride cation species can prevent the corrosion of equipment utilized in carrying out the process of the present invention and also equipment used in processes employing the modified molecular sieves such as catalytic cracking reactions.

DISCLOSURE OF INVENTION

It is therefore the primary object of the present invention to provide an alternate process for enhancing the hydrophobic character and stability of molecular sieves by altering the number of acid sites in the framework structure. This primary object is accomplished by the process which comprises:

(a) providing an activated crystalline molecular sieve selected from the group consisting of a crystalline aluminosilicate zeolite molecular sieve having a $SiO_2Al_2O_3$ molar ratio of at least 2 and a crystalline aluminophosphate molecular sieve;

(b) contacting said activated crystalline molecular sieve with a gas mixture comprising:
  (i) from 0.1 to 100 volume percent silicon tetrafluoride;
  (ii) from zero to 21 volume percent oxygen;
  (iii) and as the remainder, one or a mixture of two or more inert gases, preferably nitrogen; said contact being at a temperature of from about ambient to about 200° C. for a period of at least one minute.

A preferred embodiment of the present invention comprises ion exchanging the activated crystalline molecular sieve after step (b) with an aqueous solution such as an ammonium salt solution for a sufficient time to remove aluminum fluoride cation species, i.e., $AlF^{++}$ and $AlF_2^+$, from the treated crystalline molecular sieve. Optionally the activated crystalline molecular sieve can be treated. after step (6) by calcination at temperatures from 500° C. up to the crystal destruction temperature of the crystalline molecular sieve, by rehydration or by a combination of ion exchange, calcination and rehydration treatments in any order.

A further object of this invention is to provide crystalline molecular sieve products selected from the group consisting of the crystalline molecular sieve products identified by the numbered examples in the instant specification having the properties set forth for the numbered examples in Tables A through E hereinbelow and produced according to the claimed process of this invention. The crystalline molecular sieve composition products prepared in accordance with the process of this invention, i.e., crystalline aluminosilicate zeolite molecular sieves and crystalline aluminophosphate molecular sieves, have a crystal structure selected from the group consisting of erionite, mordenite, zeolite Y, zeolite L, zeolite LZ-105, zeolite omega, zeolite beta, zeolite ZSM-5, zeolite ZSM-11, zeolite ZSM-12, zeolite ZSM-34, zeolite ZSM-35, zeolite ZSM-48 and molecular sieve AlPO$_4$-5, including non-cation forms and cation forms containing cations selected from the group consisting of alkali metals, alkaline earth metals, alkylammonium, ammonium and hydrogen.

Yet another object of this invention is to provide a catalytic cracking process which comprises contacting a saturated hydrocarbon with a catalyst at a temperature of from about 200° C. to about 600° C., said catalyst comprising a crystalline molecular sieve selected from the group consisting of the crystalline molecular sieve products identified by the numbered examples in the specification having the properties set forth for the numbered examples in Tables A through E and produced by the process according to claim 1.

Various other objects and advantages of this invention will become apparent to those skilled in the art from the accompanying description and disclosure.

DETAILED DESCRIPTION

Crystalline molecular sieves suitably treated in accordance with the present invention include crystalline aluminosilicate zeolite molecular sieves and crystalline aluminophosphate molecular sieves. The preferred crystalline aluminosilicate zeolite molecular sieves include among others erionite, mordenite, zeolite Y, zeolite L, zeolite LZ-105, zeolite omega, zeolite beta, zeolite ZSM-5, zeolite ZSM-11, zeolite ZSM-12, zeolite ZSM-34, zeolite ZSM-35 and zeolite ZSM-48. Both naturally occurring and synthetically prepared zeolite molecular sieves can be used. Zeolite Y is disclosed in U.S. Pat. No. 3,130,007; zeolite L is disclosed in U.S. Pat. No. 3,216,789; zeolite LZ-105 is disclosed in U.S. Pat. No. 4,257,885; zeolite omega is disclosed in U.S. Pat. No. 4,241,036; zeolite beta is disclosed in U.S. Pat. No. 3,308,069; zeolite ZSM-5 is disclosed in U.S. Pat. No. 3,702,886; zeolite ZSM-11 is disclosed in U.S. Pat. No. 3,709,979; zeolite ZSM-12 is disclosed in U.S. Pat. No. 3,832,449; zeolite ZMS-34 is disclosed in U.S. Pat. No. 4,086,186; zeolite ZSM-35 is disclosed in U.S. Pat. No. 3,992,466 and zeolite ZSM-48 is disclosed in European patent publication No. 023,089, dated Jan. 28, 1981. The preferred crystalline aluminophosphate molecular sieves include among others AlPO$_4$-5, AlPO$_4$-8, AlPO$_4$-9, AlPO$_4$-11, AlPO$_4$-12, AlPO$_4$-14, AlPO$_4$-16, AlPO$_4$-17, AlPO$_4$-18, AlPO$_4$-20, AlPO$_4$-22, AlPO$_4$-25, AlPO$_4$-26, AlPO$_4$-28, and AlPO$_4$-31 all of which are disclosed in U.S. Pat. No. 4,310,440. The preparation of crystalline molecular sieves utilized in the working examples hereinbelow is described in each example.

The most preferred crystalline molecular sieves for use in the present invention have a crystal structure selected from the group consisting of erionite, mordenite, zeolite Y, zeolite L, zeolite LZ-105 and molecular sieve AlPO$_4$-5, including non-cation forms and cation forms containing cations selected from the group consisting of alkali metals, alkaline earth metals, alkylammonium, ammonium and hydrogen. The activated crystalline aluminosilicate zeolite molecular sieves utilized in the process of this invention have an initial SiO$_2$/Al$_2$O$_3$ molar ratio of at least 2, preferably from 4 to about 190.

The molecular sieve species can be used in their non-metallic cation forms as well as their as-synthesized metallic cation forms without further modification of their cation population. The molecular sieve species can also be utilized in their decationized form. In those cases in which it is desirable to decrease the proportion of metal cations associated with the AlO$_4$-tetrahedra prior to their use in the process of this invention, conventional ion exchange techniques can be resorted to in order to replace a sufficient proportion of metal cations with non-metallic cations such as hydrogen, ammonium or quaternary ammonium species. The molecular sieves can, if desired, be calcined to thermally remove some or all of the non-metallic cations to produce the corresponding dacationized form. Calcination at a temperature of about 400° C. for two hours is usually sufficient to activate hydrated molecular sieves through the evolution of the water of hydration.

The activated crystalline molecular sieves are contacted with a gas mixture comprising: (1) from 0.1 to 100 volume percent silicon tetrafluoride, preferably from about 0.25 to about 50 volume percent silicon tetrafluoride; (2) from zero to 21 volume percent oxygen and (3) as the remainder, one or a mixture of two or more inert gases, preferably from about 50 to about 99.75 volume percent of one or a mixture of two or more inert gases such as nitrogen, helium, dry air and the like. The inert gas acts as a diluent to adjust the silicon tetrafluoride concentration to a desired level. Low concentrations of silicon tetrafluoride in the gas mixture are desirably and effectively used in the process of this invention. However, the gas mixture can contain higher concentrations up to 100 volume percent of silicon tetrafluoride.

The activated crystalline molecular sieves are contacted with the silicon tetrafluoride gas mixture at a temperature range of from about ambient to about 200° C. for a sufficient period of time to alter (1) the framework aluminum and silica content, (2) surface characteristics and (3) the acidic sites of the molecular sieves. The preferred temperature for contacting the silicon tetrafluoride gas mixture with the activated crystalline molecular sieve is from about ambient to about 100° C. It is very desirable and effective to carry out the process of this invention at about ambient temperature. The process of this invention is preferably carried out at ambient pressure, however both atmospheric and superatmospheric pressure conditions may be employed in this process. In general, the reaction time can vary from a few minutes or less to several hours or longer, i.e., from 1 minute or shorter to 10 hours or longer. The preferred reaction time is from about 30 minutes to about four hours. It is readily appreciated that the required reaction time will be influenced by the reaction temperature, total pressure, concentration and flow rate of the silicon tetrafluoride gas mixture, concentration and choice of the activated crystalline molecular sieve and other factors. The process of the present invention is suitably conducted under operative conditions which give reasonable reaction rates and, of course, the desired structural modification of the activated crystalline molecular sieve.

After the crystalline molecular sieves are contacted with the silicon tetrafluoride gas mixture under the above described operational conditions, the molecular sieves are preferably ion exchanged with an aqueous solution for a sufficient period of time to remove aluminum fluoride cation species, i.e., AlF$^{++}$ and AlF$_2^+$, from the activated crystalline molecular sieve. The removal of the aluminum fluoride cation species can prevent the corrosion of equipment utilized in carrying out the process of the present invention and also equipment used in processes employing the modified molecular sieves such as catalytic cracking reactions. The crystalline molecular sieves are preferably ion exchanged one or more times, most preferably three times, with an ammonium or metal ion aqueous solution in a conventional manner. The ion exchange step of the present invention is preferably conducted under operative conditions which give essentially complete removal of residual aluminum fluoride cation species from the crystalline molecular sieve. The preferred aqueous solution for use in the ion exchange step is an ammonium salt solution such as a 10% ammonium chloride solution.

The crystalline molecular sieves can also be rehydrated or washed with distilled water for a sufficient time to remove any entrapped metal halides from the structural framework of the molecular sieve. Metal halides such as alkali metal halides, alkaline earth metal halides and aluminum halides are removed from the crystalline molecular sieve structure to further enhance the hydrophobic character of the molecular sieve product. Such metal halides can occupy the pore volume surface and cause high water adsorption near saturation. When using crystalline molecular sieves in their cation forms including alkali metal cations and alkaline earth metal cations in the process of this invention, it is preferred to wash the silicon tetrafluoride gas mixture treated molecular sieve by means of ion exchanging to remove any entrapped metal halide species from the molecular sieve. Because many metal halides sublime at relatively low temperatures, the calcination treatment step at the indicated elevated temperatures can also be used to remove impurities from the molecular sieve. Silicon tetrafluoride gas mixture treated crystalline molecular sieves in their ammonium, hydrogen or decationized form can exhibit structural dealumination, silicon atom insertion, stabilization, altered catalytic activity and enhanced hydrophobicity upon utilization of the water washing or rehydrating step. In general, the washing time can vary from a few minutes to several hours or longer. The total washing time will be influenced by the concentration and choice of crystalline molecular sieve, the amount of metal halides blocking the pore structure of the molecular sieve and other factors. The water washing step of the present invention is preferably conducted to remove essentially all metal halides from the treated activated crystalline molecular sieve to enhance the hydrophobic character of the molecular sieve product.

The silicon tetrafluoride gas mixture treated crystalline molecular sieves can further undergo calcination at a temperature of from 500° C. up to the crystal destruction temperature of the molecular sieves. This calcination step can remove non-metallic cations such as ammonium cations from the treated crystalline molecular sieve to give, if desired, an essentially decationized molecular sieve product. Decationization of crystalline molecular sieves in their metal cation form is evidenced by the formation of water-soluble metal halides. The calcination step in addition to the process step involving reacting the silicon tetrafluoride gas mixture with the structural aluminum of the molecular sieve at elevated temperatures provides for high purity molecular sieve products. The silicon tetrafluoride gas mixture treated molecular sieves of this invenion exhibit dealumination, silica insertion, decationization and enhanced hydrophobicity while retaining a high level of crystallinity even at elevated calcination treatment temperatures utilized in the process described herein.

The crystalline molecular sieve compositions prepared in accordance with the process of the present invention can be used as selective hydrophobic adsorbents or as catalysts in, for example, catalytic cracking reactions. These molecular sieve compositions have the properties set forth for the numbered examples in Tables A through E hereinbelow. The preferred crystalline aluminosilicate zeolite molecular sieve and aluminophosphate molecular sieve compositions prepared by the process of this invention have a crystal structure selected from the group consisting of erionite, mordenite, zeolite Y, zeolite L, zeolite LZ-105 and molecular sieve AlPO$_4$-5, including non-cation forms and cation forms containing cations selected from the group consisting of alkali metals, alkaline earth metals, alkylammonium, ammonium and hydrogen.

Although this invention has been described with respect to a number of details, it is not intended that the scope of this invention should be limited thereby. The examples which follow are intended solely to illustrate the embodiments of this invention which to date have been determined and are not intended in any way to limit the scope and the intent of this invention.

In carrying out the process of this invention, it is advantageous to utilize a reactor having means for evacuating the gases therefrom as well as means for regulating the temperature. The reactor used in the following Examples 1-32 and Comparative Examples A-M included an enclosed mild steel container resistant to fluoride corrosion measuring approximately 17 inches in length by 10 inches in width with a height of 4 inches and a total volume of approximately 11.8 liters. The reactor was equipped with a removable lid and a ¼ inch stainless steel tubing inlet and outlet. A hot plate or oven was used to heat the reactor. The temperature of a sample in the reactor was measured with a thermocouple embedded in the sample. A temperature controller was used to regulate the temperature to within ±5° C. The flow of the silicon tetrafluoride gas mixture into the reactor was controlled with a series of rotometers. The crystalline molecular sieve samples were placed inside the reactor in teflon containers measuring approximately 4 inches in length by 4 inches in width with a height of 1 inch. The silicon tetrafluoride gas mixture was thoroughly mixed in a mixing chamber or cylinder before entering the reactor. Gas escaping from the reactor was directed to a scrubber system consisting of a soda lime trap vented to the top of a hood. The general procedure included: (1) introducing the crystalline molecular sieve starting material into the reactor; (2) adjusting the temperature to the indicated temperatures in the examples, i.e., from about ambient to about 200° C.; (3) removing the bulk of the air over the crystalline molecular sieve sample by means of a vacuum pump (a pressure of about $10^{-3}$ Torr is adequate) or flushing with nitrogen gas; (4) introducing the silicon tetrafluoride gas mixture at a minimal flow rate which results in a continuous flow of the gas mixture through the system for a period of time sufficient to achieve the desired increase in hydrophobicity of the crystalline molecular sieve sample, i.e., from about 1 minute to about 10 hours; and (5) evacuating or flushing the reactor to remove the residual silicon tetrafluoride. Thereafter, the silicon tetrafluoride gas mixture treated molecular sieves are preferably ion exchanged with an aqueous solution, i.e., ammonium salt solution, for a sufficient time to remove aluminum fluoride cation species, i.e. $AlF^{++}$ and $AlF_2^+$, from the treated crystalline molecular sieve. The final crystalline molecular sieve product is then stored in a sealed container to prevent reaction with water vapor.

In evaluating the hydrophobic character of the silicon tetrafluoride gas mixture treated crystalline molecular sieve products of the present invention, a "shake-test" procedure was employed, in which 1.0 gram of the activated molecular sieve sample was introduced into 10 milliliters of a solution of 1.0 volume percent n-butanol in water. The slurry of molecular sieve and solution was shaken for about 90 minutes at room temperature, and then the liquid phase was analyzed for residual n-butanol content. The amount of n-butanol adsorbed by the molecular sieve sample was used to determine the percent of n-butanol adsorbed, thereby providing a measure of the relative preference of the molecular sieve for the less polar adsorbate, which provided a measure of the hydrophobicity of the molecular sieve.

In evaluating the catalytic character of the silicon tetrafluoride gas mixture treated molecular sieve products as described in Examples 29-32 and Comparative Examples J-M, a test procedure was employed involving the catalytic cracking of premixed n-butane at 2 mole percent in a helium stream. The mixture containing 2 mole percent n-butane in helium was obtained from Union Carbide Corporation. The mixture underwent cracking in a one-half inch outside diameter quartz tube reactor into which was added 0.5 to 5.0 grams at 20-40 mesh of crystalline molecular sieve sample to be tested. The crystalline molecular sieve sample was activated in situ for 60 minutes at 500° C. under 200 cm$^3$/minute dry helium purge. The mixture containing 2 mole percent n-butane in helium was then passed at a rate of 50 cm$^3$/minute over the crystalline molecular sieve sample for 40 minutes, ith a product stream analysis carried out at 10 minute intervals. The first order rate constant was then calculated to determine the activity of the molecular sieve catalyst as follows:

$$\text{First Order Rate Constant (cm}^3\text{/gm min)} = \frac{F \ln(1-c)}{W}$$

where F is the flow rate in cm$^3$/min., W is the activated crystalline molecular sieve sample weight in grams and c is the mole fraction of n-butane consumed.

Examples 1-11 and Comparative Examples A-D

A series of four 10 gram samples designated as Examples 1-4 consisting of synthetic large pore hydrogen mordenite (H$^+$-mordenite) obtained from the Norton Company as Zeolon H and having a SiO$_2$/Al$_2$O$_3$ molar ratio of 13.9 and a Na$_2$O/Al$_2$O$_3$ molar ratio of 0.03, a series of two 10 gram samples designated as Examples 5-6 consisting of Linde Y-52 zeolite, a tradename of crystalline molecular sieves treated with a gas mixture containing silicon tetrafluoride.

TABLE A

| Example | Molecular Sieve | Gas Mixture (Volume %) | | Time (Minutes) | Temperature (°C.) | Chemical Composition* | | | | $SiO_2/Al_2O_3$ Molar Ratio |
|---|---|---|---|---|---|---|---|---|---|---|
| | | $SiF_4$ | $N_2$ | | | $SiO_2$ | $Al_2O_3$ | F | $P_2O_5$ | |
| A | $H^+$—mordenite | — | — | — | — | 89.3 | 10.9 | — | — | 13.9 |
| 1 | $H^+$—mordenite | 40 | 60 | 30 | 25 | 92.4 | 7.6 | 0.44 | — | 20.8 |
| 2 | $H^+$—mordenite | 10 | 90 | 240 | 24 | 92.4 | 7.7 | 0.06 | — | 20.4 |
| 3 | $H^+$—mordenite | 10 | 90 | 60 | 57 | 91.2 | 9.1 | 0.02 | — | 16.8 |
| 4 | $H^+$—mordenite | 0.5 | 99.5 | 510 | 25 | | | | | |
| | | 5.0 | 95 | 300 | | 89.7 | 10.0 | 0.05 | — | 15.2 |
| B | Linde Y-52 | — | — | — | — | 64.5 | 22.2 | — | — | 4.9 |
| 5 | Linde Y-52 | 1 | 99 | 30 | 25 | 75.7 | 20.1 | 1.2 | — | 6.4 |
| 6 | Linde Y-52 | 0.25 | 99.75 | 240 | 22 | 76.9 | 20.5 | 0.54 | — | 6.4 |
| C | Linde Y-62 | — | — | — | — | 70.9 | 25.0 | — | — | 4.8 |
| 7 | Linde Y-62 | 0.25 | 99.75 | 240 | 22 | 76.0 | 21.9 | 5.3 | — | 5.9 |
| 8 | Linde Y-62 | 1.0 | 99.0 | 60 | 66 | 76.6 | 22.9 | 2.9 | — | 5.7 |
| 9 | Linde Y-62 | 1.0 | 99.0 | 60 | 120 | 74.9 | 23.3 | 2.45 | — | 5.5 |
| 10 | Linde Y-62 | 1.0 | 99.0 | 30 | 25 | 75.5 | 22.6 | 4.95 | — | 5.7 |
| D | $AlPO_4$—5 | — | — | — | — | 0 | 42.2 | — | 56.6 | — |
| 11 | $AlPO_4$—5 | 10 | 90 | 240 | 24 | 0.85 | 41.5 | 1.7 | 54.5 | — |

*Weight percent divided by 1-loss on ingnition at 1000° C.

Union Carbide Corporation, having a $SiO_2/Al_2O_3$ molar ratio of 4.9 and a $Na_2O/Al_2O_3$ molar ratio of 0.95, a series of four 10 gram samples designated as Examples 7-10 consisting of Linde Y-62 zeolite, a tradename of Union Carbide Corporation, having a $SiO_2/Al_2O_3$ molar ratio of 4.8 and a $Na_2O/Al_2O_3$ of 0.17, and one 10 gram sample designated as Example 11 consisting of a crystalline aluminophosphate molecular sieve composition, hereinafter designated $AlPO_4$-5 molecular sieve, within the scope of U.S. Pat. No. 4,310,440 assigned to Union Carbide Corporation, having 56.6 weight percent $P_2O_5$ and 42.2 weight percent $Al_2O_3$ on an anhydrous basis were contacted with silicon tetrafluoride-nitrogen gas mixtures of various proportions indicated in Table A for various time periods also indicated in Table A. Each of these samples was contacted with the specified gas mixture at a temperature indicated in Table A. The samples designated as Comparative Examples A, B, C and D consisting respectively of the synthetic large pore hydrogen mordenite ($H^+$-mordenite), Linde Y-52 zeolite, Linde Y-62 zeolite and $AlPO_4$-5 molecular sieve were not contacted with a silicon tetrafluoride-nitrogen gas mixture. The silicon tetrafluoride-nitrogen gas mixture treated samples were then ion exchanged three times at refluxing temperature using a 10% $NH_4Cl$ solution with a sample (gram) to solution (cm$^3$) ratio of 1 to 10 for a duration of one (1) hour. After the third ion exchange, the samples were washed until essentially free of chlorides. The chemical compositions of all of the samples were then determined by conventional chemical analysis with the results given in Table A. The increase in $SiO_2/Al_2O_3$ molar ratios for the aluminosilicate zeolite molecular sieves and the decrease in the $Al_2O_3$ weight percent reported in Table A for the treated aluminosilicate and aluminophosphate samples as compared with the untreated samples are strong evidence of structural dealumination and thus increased hydrophobicity. Also, the increase in $SiO_2$ weight percent reported in Table A for the treated aluminosilicate and aluminophosphate samples as compared with the untreated samples is strong evidence of silica insertion into the structural framework of the crystalline molecular sieves treated with a gas mixture containing silicon tetrafluoride.

EXAMPLES 12-15

A series of four 15 gram samples designated as Examples 12-15 consisting of synthetic large pore hydrogen mordenite ($H^+$-mordenite) obtained from the Norton Company as Zeolon H and having a $SiO_2/Al_2O_3$ molar ratio of 13.9 and a $Na_2O/Al_2O_3$ molar ratio of 0.03 were contacted with silicon tetrafluoride-nitrogen gas mixtures of specified proportions indicated in Table B for various time periods also indicated in Table B. Each of these samples were contacted with the specified gas mixture at a temperature indicated in Table B. The silicon teterafluoride-nitrogen gas mixture treated samples were then ion exchanged three times at refluxing temperature using a 10% $NH_4Cl$ solution with a sample (gram) to solution (cm$^3$) ratio of 1 to 10 for a duration of one hour. After the third ion exchange, the samples of Examples 13 and 15 were contacted a second time with silicon tetrafluoride-nitrogen gas mixtures of specified proportions indicated in Table B for various time periods also indicated in Table B. The samples of Examples 13 and 15 were contacted the second time with the specified gas mixture at a temperature indicated in Table B. The silicon tetrafluoride-nitrogen gas mixture treated samples of Examples 13 and 15 were then ion exchanged a second time in a manner identical to the first ion exchange treatment. All of the samples were then washed with distilled water until essentially free of chlorides. The chemical compositions of all the samples were then determined by conventional chemical analysis with the results given in Table B. The increase in $SiO_2/Al_2O_3$ molar ratios and decrease in $Al_2O_3$ weight percent reported in Table B after the second silicon tetrafluoride-nitrogen gas mixture treatment as compared with the first silicon tetrafluoride-nitrogen gas mixture treatment are strong evidence of structure dealumination and thus increased hydrophobicity resulting from such successive treatments. Also, the increase in $SiO_2$ weight percent reported in Table B for the twice treated samples as compared with the once treated samples is strong evidence of silica insertion into the structural framework of the crystalline molecular sieves treated with a gas mixture containing silicon tetrafluoride.

TABLE B

| Example | Molecular Sieve | Gas Mixture (Volume %) SiF$_4$ | N$_2$ | Time (Minutes) | Temperature (°C.) | Chemical Composition* SiO$_2$ | Al$_2$O$_3$ | F | NH$_4$ | SiO$_2$/Al$_2$O$_3$ Molar Ratio |
|---|---|---|---|---|---|---|---|---|---|---|
| 12 | H$^+$—mordenite (first treatment) | 10 | 90 | 60 | 57 | 77.0 | 7.7 | 0.02 | 2.4 | 16.8 |
| 13 | H$^+$—mordenite (first treatment) | 10 | 90 | 60 | 63 | 78.1 | 6.9 | 0.02 | 2.0 | 19.2 |
| 15 | H$^+$—mordenite (first treatment) | 10 | 90 | 240 | 24 | 77.9 | 6.5 | 0.05 | 2.3 | 20.4 |
| 15 | H$^+$—mordenite (first treatment) | 10 | 90 | 120 | 99 | 80.7 | 6.2 | 0.06 | — | 22.1 |

*Weight percent divided by 1-loss on ingnition at 1000° C.

EXAMPLES 16–23 AND COMPARATIVE EXAMPLES E–F

A series of five 10 gram samples designated as Examples 16–20 consisting of synthetic large pore hydrogen mordenite (H$^+$-mordenite) obtained from the Norton Company as Zeolon H and having a SiO$_2$/Al$_2$O$_3$ molar ratio of 13.9 and a Na$_2$O/Al$_2$O$_3$ molar ratio of 0.03 and a series of three 10 gram samples designated as Examples 21–23 consisting of Linde Y-62 zeolite, a tradename of Union Carbide Corporation, having a SiO$_2$/Al$_2$O$_3$ molar ratio of 4.8 and a Na$_2$O/Al$_2$O$_3$ molar ratio of 0.17 were contacted with silicon tetrafluoride-nitrogen gas mixtures of various proportions indicated in Table C for various time periods also indicated in Table C. Each of these samples was contacted with the specified gas mixture at a temperature indicated in Table C. The samples designated as comparative Examples E–F consisting respectively of the synthetic large pore hydrogen mordenite (H+- mordenite) and the Linde Y-62 zeolite were not contacted with a silicon tetrafluoride-nitrogen gas mixture. The silicon tetrafluoride-nitrogen gas mixture treated samples were then ion exchanged three times at refluxing temperature using a 10% NH$_4$Cl solution with a sample (gram) to solution (cm$^3$) ratio of 1 to 10 for a duration of one hour. Example 16 was not ion exchanged after the silicon tetrafluoride-nitrogen gas mixture treatment. Examples 18–20 were contacted a second time with silicon tetrafluoride-nitrogen gas mixtures of specified proportions in Table C for various time periods also indicated in Table C. The samples of Examples 18–20 were contacted the second time with the specified gas mixture at a temperature indicated in Table C. The silicon tetrafluoride-nitrogen gas mixture treated samples of Examples 18–20 were then ion exchanged a second time in a manner identical to the first ion exchanged treatment. All of the samples except the non-ion exchanged sample of Example 16 were then washed with distilled water until essentially free of chlorides and thereafter all of the samples were analyzed using a Fourier transform I.R. spectrometer and standard KBr pellet techniques. The pertinent treatment data as well as peak positions of prominent I.R. bands are set forth in Table C. Shifts in these bands to higher wave numbers in the silicon tetrafluoride-nitrogen gas mixture treated samples as compared with the untreated comparative samples coupled with a sharpening of some of the bands are strong evidence of structural dealumination and stabilization respectively.

TABLE C

| Example | Molecular Sieve | Gas Mixture (Volume %) SiF$_4$ | N$_2$ | Time (minutes) | Temperature (°C.) | I.R. Band Positions (cm$^{-1}$) | | | I.R. Band Sharpening |
|---|---|---|---|---|---|---|---|---|---|
| E | H$^+$—mordenite | — | — | — | — | 1075 | 809 | 584 | — |
| 16 | H$^+$—mordenite | 10 | 90 | 60 | 26 | 1076 | 800 | 578 | No |
| 17 | H$^+$—mordenite | 10 | 90 | 60 | 57 | 1073 | 808 | 583 | Yes |
| 18 | H$^+$—mordenite | 10 | 90 | 60 | 57 | | | | |
| | | 10 | 90 | 60 | 63 | 1077 | 811 | 585 | Yes |
| 19 | H$^+$—mordenite | 10 | 90 | 120 | 92 | 1074 | 809 | 583 | Yes |
| 20 | H$^+$—mordenite | 10 | 90 | 120 | 92 | | | | |
| | | 10 | 90 | 120 | 99 | 1083 | 813 | 587 | Yes |
| F | Linde Y-62 | — | — | — | — | 1018 | 786 | 574 | — |
| 21 | Linde Y-62 | 0.25 | 99.75 | 240 | 22 | 1024 | 787 | 576 | No |
| 22 | Linde Y-62 | 1.0 | 99 | 60 | 120 | 1024 | 786 | 575 | No |
| 23 | Linde Y-62 | 1.0 | 99 | 30 | 25 | 1034 | 789 | 579 | No |

Examples 24–28 and Comparative Examples G–I

A series of three 30 gram samples designated as Examples 24–26 consisting of synthetic large pore hydrogen mordenite (H$^+$-mordenite) obtained from the Norton Company as Zeolon H and having a SiO$_2$/Al$_2$O$_3$ molar ratio of 13.9 and a Na$_2$O/Al$_2$O$_3$ molar ratio of 0.03, one 10 gram sample designated as Example 27 consisting of Linde Y-52 zeolite, a tradename of Union Carbide Corporation, having a SiO$_2$/Al$_2$O$_3$ molar ratio of 4.9 and a Na$_2$O/Al$_2$O$_3$ molar ratio of 0.95, and one 10 gram sample designated as Example 28 consisting of Linde Y-62 zeolite, a tradename of Union Carbide Corporation, having a SiO$_2$/Al$_2$O$_3$ molar ratio of 4.8 and a Na$_2$O/Al$_2$O$_3$ molar ratio of 0.17 were contacted with silicon tetrafluoride-nitrogen gas mixtures of various proportions indicated in Table D for various time periods also indicated in Table D. Each of these samples was contacted with the specified gas mixture at a temperature indicated in Table D. The samples designated as Comparative Examples G–I consisting respectively of the synthetic large pore hydrogen mordenite (H+-mordenite), Linde Y-52 zeolite and Linde Y-62 zeolite were not contacted with a silicon tetrafluoride-nitrogen gas mixture. The silicon tetrafluoride-nitrogen gas mixture treated samples of Examples 24 and 26 were then ion exchanged three times at refluxing temperature using a 10% NH$_4$Cl solution with a sample (gram) to solution (cm$^3$) ratio of 1 to 10 for a duration of one hour. The remaining Examples 25, 27 and 28 were not ion exchanged after the silicon tetrafluoride/nitrogen gas mixture treatment. Examples 24 and 25 were contacted a second time with silicon tetrafluoride-nitrogen gas mixtures of specified proportions indicated in Table D for time periods also indicated in Table D. Each of the samples in Examples 24 and 25 were contacted the second time with the specified gas mixture at a temperature indicated in Table D. The silicon tetrafluoride-nitrogen gas mixture treated sample of Example 24 was then ion exchanged a second time in a manner identical to the first ion exchange treatment. All of the samples were then tested for hydrophobicity using the aqueous n-butanol solution shake test as previously described with the results set forth in Table D. The samples treated with the silicon tetrafluoride-nitrogen gas mixture show less n-butanol remaining in the test solution, and thus greater hydrophobicity, than the comparative samples not treated with the silicon tetrafluoride-nitrogen gas mixture.

consisting of Linde Y-52 zeolite, a tradename of Union Carbide Corporation, having a SiO$_2$/Al$_2$O$_3$ molar ratio of 4.9 and a Na$_2$O/Al$_2$O$_3$ molar ratio of 0.95, one 10 gram sample designated as Example 31 consisting of Linde Y-62 zeolite, a tradename of Union Carbide Corporation, having a SiO$_2$/Al$_2$O$_3$ molar ratio of 4.8 and a Na$_2$O/Al$_2$O$_3$ molar ratio of 0.17 and one 10 gram sample designated as Example 32 consisting of AlPO$_4$-5 molecular sieve within the scope of U.S. Pat. No. 4,310,440 assigned to Union Carbide Corporation, having 56.6 weight percent P$_2$O$_5$ and 42.2 weight percent Al$_2$O$_3$ on an anhydrous basis were contacted with silicon tetrafluoride-nitrogen gas mixtures of various proportions indicated in Table E for various time periods also indicated in Table E. Each of these samples were contacted with the specified gas mixture at a temperature indicated in Table E. The samples designated as Comparative Examples J–M consisting respectively of the synthetic large pore hydrogen mordenite (H+-mordenite), Linde Y-52 zeolite, Linde Y-62 zeolite and AlPO$_4$-5 molecular sieve were not contacted with a silicon tetrafluoride-nitrogen gas mixture. The silicon tetrafluoride-nitrogen gas mixture treated samples were then ion exchanged three times at refluxing temperature using a 10% NH$_4$Cl solution with a sample (gram) to solution (cm$^3$) ratio of 1 to 10 for a duration of one hour. After the third ion exchange, the samples were washed with distilled water until essentially free of chlorides. In accordance with the procedure described previously in regard to evaluating the catalytic character of silicon tetrafluoride-nitrogen gas mixture treated molecular

TABLE D

| | | Treatment Conditions | | | | |
|---|---|---|---|---|---|---|
| | Molecular | Gas Mixture (Volume %) | | Time | Temperature | Shake Test, % n-butanol |
| Example | Sieve | SiF$_4$ | N$_2$ | (minutes) | (°C.) | remaining in test solution |
| G | H+—mordenite | — | — | — | — | 99.2 |
| 24 | H+—mordenite | 10 | 90 | 240 | 24 | |
| | | 10 | 90 | 120 | 99 | 77.0 |
| 25 | H+—mordenite | 10 | 90 | 240 | 24 | |
| | | 10 | 90 | 120 | 99 | 85.0 |
| 26 | H+—mordenite | 10 | 90 | 120 | 92 | 87.0 |
| H | Linde Y-52 | — | — | — | — | 100.6* |
| 27 | Linde Y-52 | 0.25 | 99.75 | 240 | 22 | 96.5 |
| I | Linde Y-62 | — | — | — | — | 101.7* |
| 28 | Linde Y-62 | 0.25 | 99.75 | 240 | 22 | 100.0 |

*Numbers larger than 100 denote water removal.

Examples 29–32 and Comparative Examples J–M

The effect of silicon tetrafluoride-nitrogen gas mixture treatment on the catalytic properties of crystalline molecular sieves was evaluated using samples of both silicon tetrafluoride treated and silicon tetrafluoride untreated molecular sieves. One 10 gram sample designated as Example 29 consisting of synthetic large pore hydrogen mordenite (H+-mordenite) obtained from the Norton Company as Zeolon H and having a SiO$_2$/Al$_2$O$_3$ molar ratio of 13.9 and a Na$_2$O/Al$_2$O$_3$ molar ratio of 0.03, one 10 gram sample designated as Example 30 sieve products, the first order rate constant for the catalytic cracking of 2% n-butane in helium at 500° C. after ten minutes of reaction time was determined for all of the samples. The results are set forth in Table E. As is readily apparent from the data in Table E, the n-butane cracking ability, and thus the acidity, of a molecular sieve can be altered by the silicon tetrafluoride gas mixture treatment of the present invention. By varying the silicon tetrafluoride gas mixture treatment time and conditions, the n-butane cracking ability of a specific molecular sieve can be adjusted to a desired level for a particular reaction.

TABLE E

| | Molecular | Gas Mixture (Volume %) | | Time | Temperature | n-Butane Cracking at 500° C. First Order Rate Constant |
|---|---|---|---|---|---|---|
| Example | Sieve | SiF$_4$ | N$_2$ | (minutes) | (°C.) | cc/min.-gm |
| J | H+—mordenite | — | — | — | — | 135 |
| 29 | H+—mordenite | 40 | 60 | 30 | 25 | 53 |
| K | Linde Y-52 | — | — | — | — | 2.5 |
| 30 | Linde Y-52 | 1.0 | 99 | 30 | 25 | 3.2 |
| L | Linde Y-62 | — | — | — | — | 3.3 |

TABLE E-continued

| Example | Molecular Sieve | Gas Mixture (Volume %) | | Time (minutes) | Temperature (°C.) | n-Butane Cracking at 500° C. First Order Rate Constant cc/min.-gm |
|---|---|---|---|---|---|---|
| | | SiF$_4$ | N$_2$ | | | |
| 31 | Linde Y-62 | 1.0 | 99 | 30 | 25 | 4.4 |
| M | AlPO$_4$—5 | — | — | — | — | 0.35 |
| 32 | AlPO$_4$—5 | 10 | 90 | 240 | 24 | 0.05 |

We claim:

1. A process for treating an aluminophosphate molecular sieve comprising contacting an aluminophosphate molecular sieve having a framework structure whose chemical composition expressed in terms of mole ratios of oxides is:

$$Al_2O_3:1.0\pm0.2P_2O_5:$$

each of said framework structures being microporous in which the pores are uniform and have nominal diameters within the range of about 3 to about 10 Angstroms, an intracrystalline adsorption capacity for water at 4.6 torr and 24° C. of at least 3.5 weight percent, the adsorption and desorption of water being completely reversible while retaining the same essential framework topology in both the hydrated and dehydrated state, at a temperature of from about ambient temperature to about 200° C. for a period of at least one minute with a gas mixture comprising:
   (i) from 0.1 to 100 volume percent silicon tetrafluoride;
   (ii) from zero to 21 volume percent oxygen; and
   (iii) the remainder of said gas mixture comprising one or more insert gases.

2. The process of claim 1 wherein the temperature is from 24° C. to about 200° C.

3. The process of claim 1 wherein said product is then hydrated.

4. The process of claim 1 which involves the additional step of calcining the product at a temperature of from 500° C. up to the crystal destruction temperature of the aluminophosphate.

5. The process of claim 1 wherein the inert gas is selected from the group consisting of nitrogen, helium and mixtures thereof.

6. The process of claim 1 which involves the additional step of ion exchanging the product of the process of claim 1 with an aqueous solution of a cation for a sufficient time to remove aluminum fluoride cation species.

7. The process of claim 1 wherein the aluminophosphate is selected from the group consisting of AlPO$_4$-5, AlPO$_4$-8, AlPO$_4$-9, AlPO$_4$-11, AlPO$_4$-12, AlPO$_4$14, AlPO$_4$-16, AlPO$_4$-17, AlPO$_4$-18, AlPO$_4$-20, AlPO$_4$-22, AlPO$_4$-25, AlPO$_4$-26, AlPO$_4$-28 and AlPO$_4$-31.

* * * * *

UNITED STATES PATENT AND TRADEMARK OFFICE
CERTIFICATE OF CORRECTION

PATENT NO.   : 4569833
DATED        : February 11, 1986
INVENTOR(S)  : Frank Peter Gortsema and Brent Mei Tak Lok It is certified that error appears in the above-identified patent and that said Letters Patent is hereby corrected as shown below:

Col. 3, line 67 "step (6)" should be -- step (b) --.

Col. 8, line 51 "ith" should be -- with --.

Table B

Example 13 in Molecular Sieve Column (first treatment) should be -- (second treatment) --.

Example 15 in Molecular Sieve Column (first treatment) should be -- (second treatment) --.

Signed and Sealed this

Fifth Day of August 1986

[SEAL]

Attest:

DONALD J. QUIGG

Attesting Officer       Commissioner of Patents and Trademarks